United States Patent
Sinclair et al.

(10) Patent No.: US 8,180,465 B2
(45) Date of Patent: *May 15, 2012

(54) MULTI-MODAL DEVICE POWER/MODE MANAGEMENT

(75) Inventors: Michael J. Sinclair, Kirkland, WA (US); David W. Williams, Woodinville, WA (US); Zhengyou Zhang, Bellevue, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/014,419

(22) Filed: Jan. 15, 2008

(65) Prior Publication Data

US 2008/0126282 A1   May 29, 2008

Related U.S. Application Data

(63) Continuation of application No. 11/261,108, filed on Oct. 28, 2005, now Pat. No. 7,319,908.

(51) Int. Cl.
*G05B 11/01* (2006.01)
*G05D 3/12* (2006.01)

(52) U.S. Cl. ........... 700/66; 700/295; 713/324; 715/708

(58) Field of Classification Search .............. 700/22, 700/56, 66, 286, 291, 295, 297, 298; 715/708; 345/169; 713/300, 320, 323, 324; 600/300, 600/301; 361/679.55, 679.56; 455/574

See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,625,569 A | 4/1997 | Trimmer et al. | |
| 5,812,865 A | 9/1998 | Theimer et al. | |
| 6,083,156 A * | 7/2000 | Lisiecki | 600/301 |
| 6,348,867 B1 * | 2/2002 | Myllymaki | 340/573.1 |
| 6,353,398 B1 | 3/2002 | Amin et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |

(Continued)

FOREIGN PATENT DOCUMENTS

WO   9800787   1/1998

OTHER PUBLICATIONS

Andy Harter, et al., A Distributed Location System for the Active Office, IEEE Network, 1994, pp. 62-70.

(Continued)

*Primary Examiner* — M. N. Von Buhr
(74) *Attorney, Agent, or Firm* — Lee & Hayes, PLLC

(57) ABSTRACT

A system that facilitates managing resources (e.g., functionality, services) based at least in part upon an established context. More particularly, a context determination component can be employed to establish a context by processing sensor inputs or learning/inferring a user action/preference. Once the context is established via context determination component, a power/mode management component can be employed to activate and/or mask resources in accordance with the established context. The power and mode management of the device can extend life of a power source (e.g., battery) and mask functionality in accordance with a user and/or device state.

20 Claims, 10 Drawing Sheets

U.S. PATENT DOCUMENTS

| | | | |
|---|---|---|---|
| 6,601,012 B1* | 7/2003 | Horvitz et al. | 702/150 |
| 6,622,252 B1* | 9/2003 | Klaassen et al. | 713/320 |
| 6,631,271 B1* | 10/2003 | Logan | 455/456.1 |
| 6,672,506 B2 | 1/2004 | Swartz et al. | |
| 6,726,106 B1* | 4/2004 | Han et al. | 235/472.01 |
| 6,731,274 B2* | 5/2004 | Powell | 345/204 |
| 6,741,188 B1 | 5/2004 | Miller et al. | |
| 6,745,193 B1* | 6/2004 | Horvitz et al. | 707/796 |
| 6,747,675 B1 | 6/2004 | Abbott et al. | |
| D494,584 S | 8/2004 | Schlieffers et al. | |
| 6,774,795 B2* | 8/2004 | Eshelman et al. | 340/573.1 |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,920,283 B2* | 7/2005 | Goldstein | 396/59 |
| 6,928,428 B1* | 8/2005 | De Vries | 707/749 |
| 6,930,608 B2* | 8/2005 | Grajales et al. | 340/573.5 |
| 6,996,402 B2* | 2/2006 | Logan et al. | 455/456.1 |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,159,130 B2* | 1/2007 | Koo | 713/300 |
| 7,171,378 B2 | 1/2007 | Petrovich et al. | |
| 7,176,833 B2* | 2/2007 | Jendbro et al. | 342/357.64 |
| 7,195,157 B2 | 3/2007 | Swartz et al. | |
| 7,222,245 B2* | 5/2007 | Singh | 713/300 |
| 7,249,159 B1* | 7/2007 | Horvitz et al. | 709/206 |
| 7,254,376 B2* | 8/2007 | Park et al. | 455/100 |
| 7,256,795 B2* | 8/2007 | Chen | 345/597 |
| 7,385,501 B2 | 6/2008 | Miller et al. | |
| 7,447,507 B1* | 11/2008 | Infosino | 455/456.1 |
| 7,483,805 B2* | 1/2009 | Sparks et al. | 702/130 |
| 7,525,450 B2 | 4/2009 | Miller et al. | |
| 7,543,163 B2* | 6/2009 | Kernahan et al. | 713/300 |
| 7,577,516 B2* | 8/2009 | Dobeck et al. | 701/200 |
| 7,603,427 B1* | 10/2009 | Horvitz et al. | 709/207 |
| 7,606,866 B2* | 10/2009 | Mora | 709/207 |
| 7,609,472 B2* | 10/2009 | Atkinson | 360/75 |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0042266 A1 | 4/2002 | Heyward et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087649 A1* | 7/2002 | Horvitz | 709/207 |
| 2002/0099817 A1 | 7/2002 | Abbott et al. | |
| 2002/0178022 A1* | 11/2002 | Anderson et al. | 705/1 |
| 2003/0046401 A1 | 3/2003 | Abbott et al. | |
| 2003/0140088 A1* | 7/2003 | Robinson et al. | 709/202 |
| 2003/0154476 A1 | 8/2003 | Abbott, III et al. | |
| 2003/0197597 A1* | 10/2003 | Bahl et al. | 340/7.58 |
| 2004/0002958 A1* | 1/2004 | Seshadri et al. | 707/3 |
| 2004/0002988 A1* | 1/2004 | Seshadri et al. | 707/102 |
| 2004/0077407 A1* | 4/2004 | Jandel | 463/36 |
| 2004/0143636 A1* | 7/2004 | Horvitz et al. | 709/207 |
| 2004/0201500 A1 | 10/2004 | Miller et al. | |
| 2005/0034078 A1 | 2/2005 | Abbott et al. | |
| 2005/0064911 A1* | 3/2005 | Chen et al. | 455/566 |
| 2005/0066207 A1* | 3/2005 | Fleck et al. | 713/320 |
| 2005/0076256 A1* | 4/2005 | Fleck et al. | 713/320 |
| 2005/0091184 A1* | 4/2005 | Seshadri et al. | 707/1 |
| 2005/0096102 A1* | 5/2005 | Mock et al. | 455/574 |
| 2005/0219120 A1* | 10/2005 | Chang | 342/357.13 |
| 2005/0223247 A1* | 10/2005 | Hohnke | 713/300 |
| 2005/0261556 A1* | 11/2005 | Such et al. | 600/300 |
| 2005/0266858 A1 | 12/2005 | Miller et al. | |
| 2005/0277814 A1* | 12/2005 | Seo et al. | 600/300 |
| 2006/0019676 A1 | 1/2006 | Miller et al. | |
| 2006/0194082 A1* | 8/2006 | Tucker et al. | 429/9 |
| 2006/0224046 A1* | 10/2006 | Ramadas et al. | 600/300 |
| 2006/0236712 A1* | 10/2006 | Vazquez | 62/263 |
| 2007/0006098 A1* | 1/2007 | Krumm et al. | 715/825 |
| 2007/0100666 A1* | 5/2007 | Stivoric et al. | 705/3 |
| 2007/0214228 A1* | 9/2007 | Horvitz et al. | 709/207 |
| 2007/0271065 A1* | 11/2007 | Gupta et al. | 702/160 |
| 2008/0008313 A1* | 1/2008 | Fyke | 379/433.01 |
| 2008/0057894 A1* | 3/2008 | Aleksic et al. | 455/187.1 |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2009/0215504 A1* | 8/2009 | Lando | 455/574 |
| 2010/0125735 A1* | 5/2010 | Zapata et al. | 713/170 |
| 2010/0191356 A1* | 7/2010 | Wehrenberg et al. | 700/94 |
| 2010/0331053 A1* | 12/2010 | Song et al. | 455/566 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

\* cited by examiner

MULTI-MODAL DEVICE POWER/MODE MANAGEMENT

RELATED APPLICATION

This application is a Continuation of Ser. No. 11/261,108, now U.S. Pat. No. 7,319,908, filed on Oct. 28, 2005 and issued on Jan. 15, 2008, entitled MULTI-MODAL DEVICE POWER/MODE MANAGEMENT, the entire contents of which are herein incorporated by reference

BACKGROUND

Both enterprises and individuals are increasingly interested in using handheld devices. Most modern handheld devices are equipped with multiple sensors (e.g., microphone, wireless transmitter, global positioning system (GPS) engine, camera, stylus, etc.). However, there are no applications available that make full use of multiple sensors. In other words, multi-sensory technologies that make handheld devices a multi-modal multi-lingual mobile assistant are not available.

Today, portable devices such as cellular telephones and personal data assistants (PDAs) employ state-of-the-art operating systems. As such, these devices have increased computing power in hardware and increased features in software in relation to earlier technologies. Oftentimes, cellular telephones are equipped with built-in digital image capture devices (e.g., cameras) and microphones together with computing functionalities of personal digital assistants (PDAs). Since these devices combine the functionality of cellular telephones with the functionality of PDAs, they are commonly referred to as "smart-phones." The hardware and software features available in these smart-phones and similar technologically capable devices provide developers the capability and flexibility to build applications through a versatile platform. The increasing market penetration of these portable devices (e.g., PDAs) inspires programmers to build applications, games, etc. for these smart-phones.

Electronic organizers are widely used to manage and organize a variety of PIM (personal information manager) data. An electronic organizer (e.g., PIM) enables a user to electronically retain personal data for any purpose and to retrieve the data as desired. Today, PIMs can vary widely, but common to all of them is to provide methods for managing and organizing personal information and to make the information readily available to the user.

Other technologically advanced devices continue to emerge thereby assisting a user in advanced functionality. For example, sunglasses equipped with digital music capability have recently emerged into today's marketplace. These digitally-capable eyewear products are equipped with a digital audio engines thus enabling a user to remove wires used with conventional digital headphone/player combinations.

Systems do not currently exist that provide for automatically regulating functionalities and services within a portable device. Furthermore, conventional systems and devices do not leverage the increased computing power of portable devices and PCs by automatically facilitating activating and/or masking functionalities.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system that facilitates power and/or mode management of a multi-modal device. More particularly, in one aspect, in accordance with a given context, power can be managed to extend life of a power source (e.g., battery). In another aspect, modes can be managed whereby functionalities can be dynamically activated and/or masked in accordance with a given context.

Still other aspects exist that enable a device to identify a plurality of sources for charging power based upon a given context. For example, a detection component can be employed that facilitates identification of power charging sources for a device. In one particular example, a global position system (GPS) can be utilized to identify contextual factors such as a present location or movement. These contextual factors (as well as user state information) can be considered with respect to charging sources. Yet another aspect can employ machine learning mechanisms (e.g., artificial intelligence (AI)) to infer a particular location of a device. Thus, available power sources can be identified and suggested based upon the determined and/or inferred location.

In other aspects thereof, an AI component and/or learning/reasoning component is provided and can employ a probabilistic and/or statistical-based analysis to prognose or infer a user or device context. Additionally, this AI component can be employed to automatically activate and/or mask functionality based upon a prediction and/or inference.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
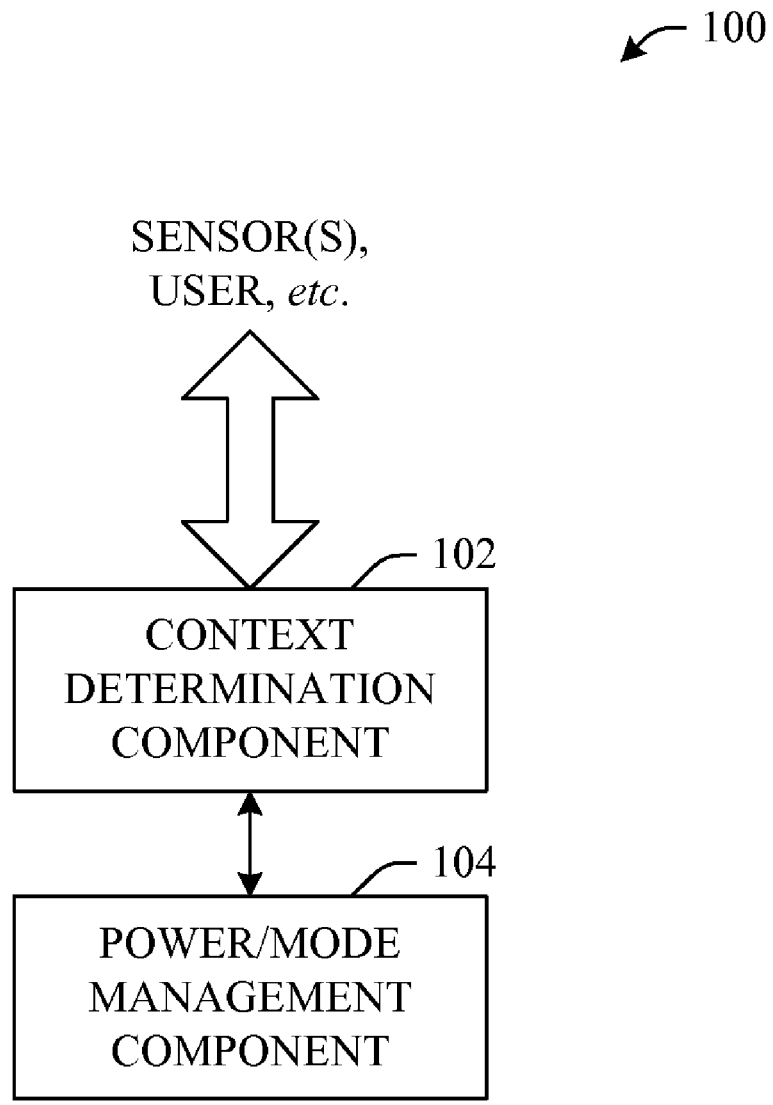
FIG. 1 illustrates a system that facilitates context-based power/mode management in accordance with an aspect of the innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates power/mode management based upon a context factor in accordance with an aspect of the claimed subject matter. Generally, the system 100 can include a context determination component 102 and a power/mode management component 104. In operation, the context determination component 102 can establish a context whereas the power/mode management component 104 can, based upon the established context, mask certain resources (e.g., services, functionalities) and regulate power accordingly.

More particularly, the context determination component 102 can employ sensory, learning, rules-based, etc. techniques to determine and/or establish a context. In accordance therewith, the power/mode management component 104 can regulate power and/or activate/deactivate resources in accordance with the established context. Additionally, the power/mode management component 104 can identify alternate power sources and/or alternate devices to accommodate changes in context.

By way of example, the context determination component 102 can determine that a user is occupied and unable to receive telephone calls. This determination can be made in any number of manners, including, but not limited to, processing of sensor outputs, learned intelligence, rules-based logic, user-prompts, etc. Accordingly, a communication device can automatically disable unnecessary functionalities thereby conserving power. By way of more specific example, the power/mode management component 104 can automatically disable indicators (e.g., flashing lights), display functionality, internal hard disk, radios, internal camera, audible alert functionalities or the like in order to extend power longevity of the device.

In still another exemplary scenario, it can be particularly useful to enable a device to capture an image(s) only in situations where a user/device travels some preset distance from a reference point. A global position system (GPS) can be employed to facilitate determination of this travel distance. It is to be understood and appreciated that the power/mode management component 104 can automatically enable/disable services based upon a context and/or device/user state.

By way of continued example, if the power/mode management component 104 determines that the GPS would consume more power than capturing images at random intervals, a decision can be made to conserve the most power possible, e.g., by randomly capturing images. It will be understood that this scenario is included to provide perspective to the contextual and user state analysis capabilities of the novel system described herein.

These, and other examples, will be described in greater detail infra with respect to the novel functionality of the power/mode management system disclosed and claimed herein. It is to be understood and appreciated that other aspects exist that employ the novel functionality of activating and/or deactivating resources to extend battery life as well as to provide modes in accordance with a particular context (e.g., state). These additional aspects are to be considered a part of this disclosure and claims appended hereto.

Figure 2:
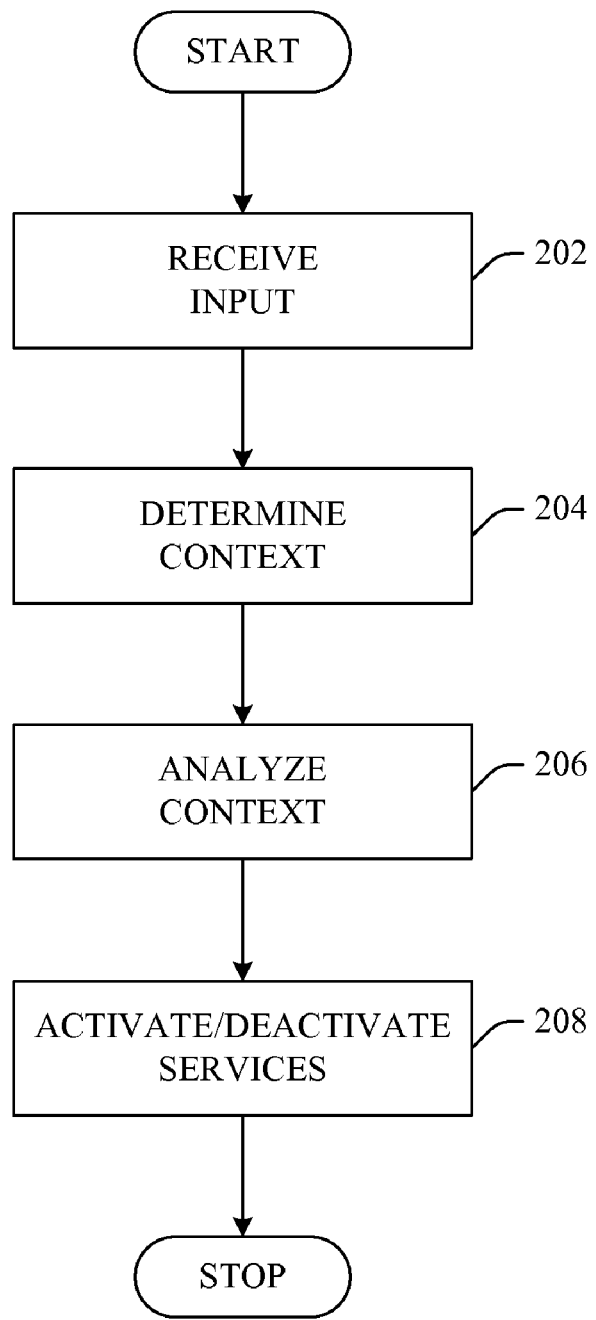
FIG. 2 illustrates an exemplary flow chart of procedures that facilitate power/mode management of resources based upon an established context in accordance with an aspect of the novel subject matter.

Turning now to FIG. 2, there is illustrated a methodology of regulating resources in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, an input is received. As will be better understood upon a review of the figures that follow, a system can receive an input, for example, from any type of sensor (e.g., physiological, environmental). Moreover, in yet other aspects, the system can inquire a user and/or application for information/ data by which a context can be established. In still other aspects, information/data can be automatically input or inputted by a user directly thereafter enabling establishment of a context.

Returning to the example of FIG. 2, once an input (or group of inputs) is received at 202, a context (e.g., user state) can be established at 204. It will be appreciated that the novel functionality of the subject systems and methodologies can be employed in accordance with any context (e.g., user state, environment, location, temporal) without departing from the scope of this disclosure and claims appended hereto. In other aspects, an image capture device and/or audio input can be employed to facilitate establishing a location context. By way of more particular example, an image, voice or sound can be captured and analyzed to establish a location. In one specific scenario, a landmark can be photographed or a foreign dialect can be recorded and analyzed to determine a location.

At 206, the context can be analyzed with respect to available resources (e.g., devices, services). Thereafter, at 208, resources can be activated and/or deactivated in accordance with the context. Furthermore, it is to be understood that the methodology of FIG. 2 can be recursive in that the acts set forth in FIG. 2 can be dynamically repeated and/or adjusted as in accordance with changes in a particular context.

Figure 3:
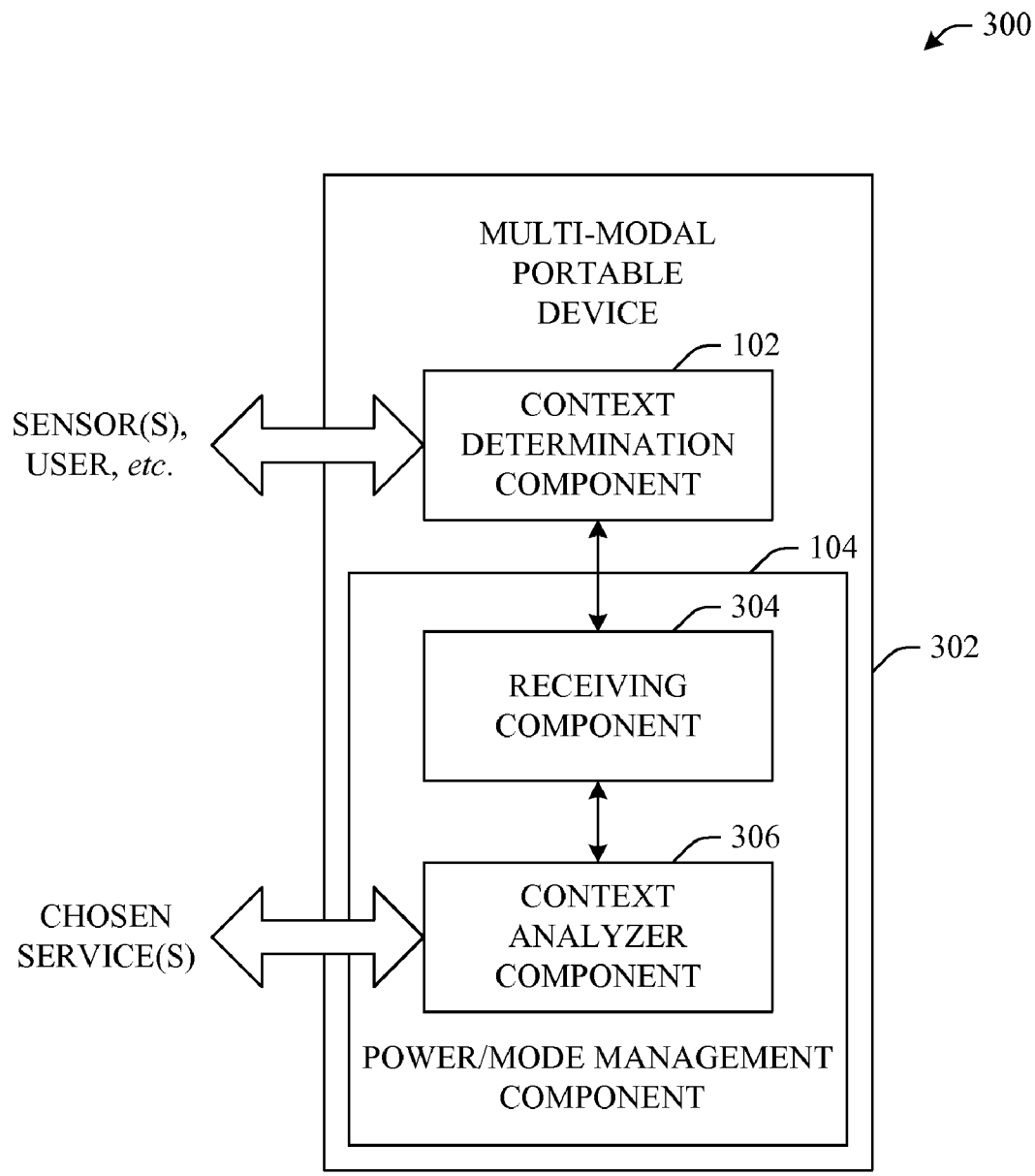
FIG. 3 illustrates a block diagram of a multi-modal device that facilitates managing power consumption and/or mode based upon a context in accordance with an aspect of the innovation.

FIG. 3 illustrates yet another exemplary system 300 that incorporates novel functionality of power/mode management with respect to a multi-modal mobile device 302. For example, the multi-modal device 302 can be a personal data assistant (PDA), smart-phone, cellular phone, pocket computer, personal music player or the like. In operation, the multi-modal mobile device can automatically establish a context (e.g., user, device) thereafter activating and/or deactivating resources (e.g., service, peripherals . . . ) in accordance therewith. It is to be understood and appreciated that this activation/deactivation can be particularly useful in optimizing power conservation and functionality in accordance with the context.

In another example, the power/mode management component 104 can facilitate inducing a sleep or other power conservation mode in accordance with the context. Similarly, the power/mode management component 104 can apply extra resources and/or bypass existing functionality in accordance with a particular context (e.g., emergency).

Referring again to FIG. 3, a block diagram of multi-modal mobile device 302 having a context determination component 102 and a power/mode management component 104 included therein is illustrated. More particularly, multi-modal device 302 can include a context determination component 102 and a power/mode management component 104 having a receiving component 304 and a context analyzer component 306.

As described supra, the context determination component 102 can be employed to establish a user context (e.g., state), environmental context, location context, temporal context, etc. Once established, the context can be automatically input into the receiving component 304. The receiving component 304 can communicate the context information received from the context determination component 102 to the context analyzer component 306.

In turn, the context analyzer component 306 can automatically and dynamically establish an appropriate power mode scheme in accordance with the instant context. As well, the context analyzer component 306 can activate and/or deactivate resources (e.g., functionality, services) in accordance with the established context. As described above, the context analyzer component can enable and/or disable specific functionalities in accordance with power conservation and/or performance objectives.

In other examples, the context analyzer component 306 can dynamically monitor the context, via receiving component 304, thereafter automatically modifying power/mode configuration(s) with respect to changes in the context. Examples of this novel functionality will be detailed infra in order to provide perspective to the claimed subject matter. It is to be understood that the examples are provided to outline the novel functionality of the subject system and/or methodology and are not to be deemed limiting in any way.

Figure 4:
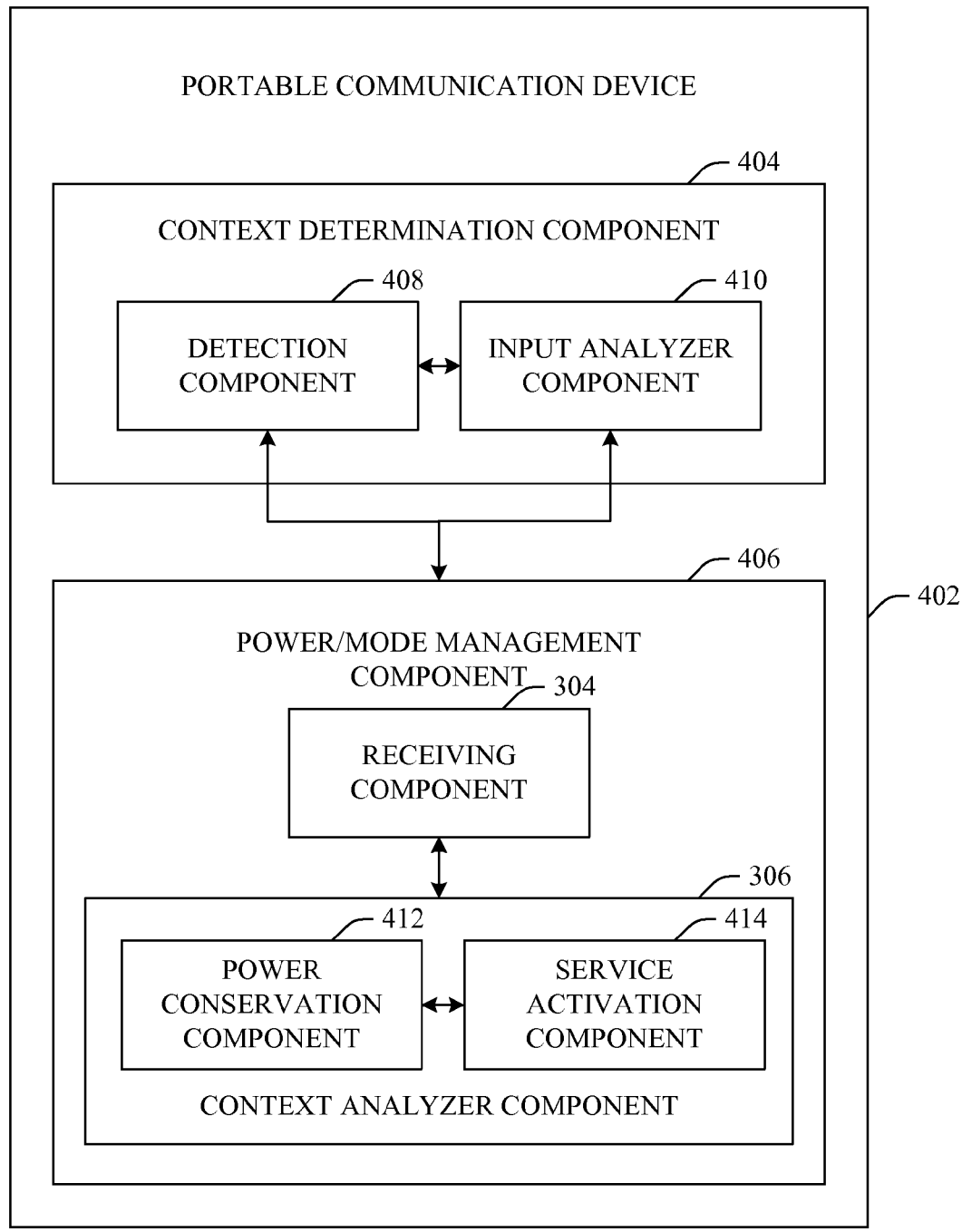
FIG. 4 illustrates a block diagram of a portable communications device that employs a power conservation component and a service activation component in accordance with an aspect of the power/mode management system.

FIG. 4 illustrates yet another aspect of the novel functionality of the claimed subject matter. More particularly, FIG. 4 illustrates a portable communications device 402 that effects power/mode management in accordance with a context factor. The exemplary context-aware device 402 as shown in FIG. 4 includes a context determination component 404 and a power mode management component 406. As described above with reference to FIG. 3, these components (404, 406) can facilitate automatically managing functionalities in accordance with a present or anticipated context.

As illustrated, portable communication device 402 can include a context determination component 404 and a power/mode management component 406. With respect to the novel functionality of the claimed subject matter, these components (404, 406) can work together to efficiently adjust functionality and/or modes of the portable communication device 402 based upon a given context. For example, if determined that a specific functionality is not needed with respect to an instant contextual factor, the specific functionality can be disabled thereby conserving power and memory as well as increasing processing performance of the portable communication device 402.

The context determination component 404 can include a detection component 408 and an input analyzer component 410. In operation, the detection component 408 can detect a contextual factor whereby the input analyzer component 410 can process the input to determine a particular context. By way of example, the detection component 408 can detect an intensity of sound and/or light whereby the input analyzer component 410 can determine a corresponding context with respect to a user and particular available functionalities. In one example, the system can automatically increase and decrease the volume and/or display brightness in accordance with the determined context. While this example is rather simplistic in nature, it is included herein to help provide perspective to the novel reactive functionality of the claimed subject matter. It is to be appreciated that countless examples exist whereby the management of power/mode can be employed. These additional examples are to be included within the scope of this disclosure and claims appended hereto.

The power/mode management component 406 of the subject invention can employ a receiving component 304 that facilitates interfacing the context information into a context analyzer component 306. The context analyzer component 306 can employ a power conservation component 412 and/or a service activation component 414 to effect context-aware management of power consumption, power supply, power mode and resource (e.g., functionality) availability.

By way of example and not limitation, the power conservation component 412 can, based upon received context information, identify a plurality of alternate sources for charging a particular power supply. For instance, the power conservation component can employ solar mechanisms to charge a power supply if the determined context indicates availability of solar power. Similarly, the power conversation component 412 can induce a sleep mode or increase processing power in accordance with a particular established context.

The service activation component 414 can be employed to activate and/or deactivate services based upon an established context. In other words, based upon information received from the context determination component 404, the service and/or functionality activation component 414 can mask (e.g., deactivate) and/or unmask (e.g., activate) functionalities. For example, if a context is established whereby a display mechanism is not necessary, the service activation component 414 can be employed to mask this non-relevant functionality thereby extending the longevity of the power supply (e.g., battery).

Figure 5:
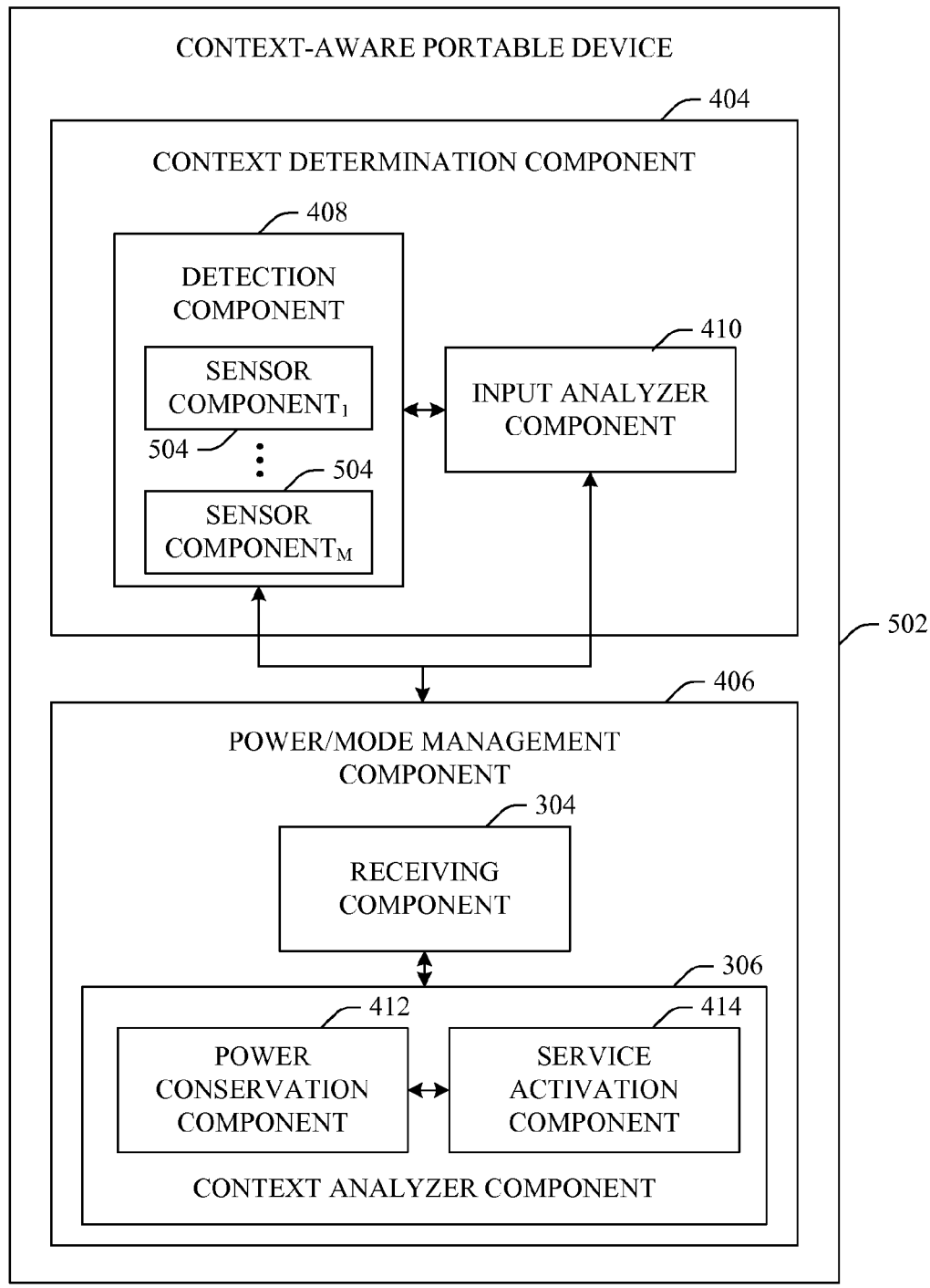
FIG. 5 illustrates a block diagram of a system that employs a detection component having multiple sensors that facilitate establishment of a context in accordance with an aspect of the innovation.

Turning now to FIG. 5, a context-aware portable device 502 that facilitates contextual adjustment of power consumption, power mode(s) and functionality is shown. Generally, the context-aware portable device 502 includes a context determination component 404 and a power/mode management component 406. As illustrated, the context determination component 404 can include a detection component 408 (e.g., environmental and physiological sensors) and an input analyzer component 410.

As shown in FIG. 5, detection component 408 can include 1 to M sensor components, where M is an integer. It is to be understood that 1 to M sensor components can be referred to individually or collectively as sensor components 504. Although the sensor components 504 are illustrated integral to the detection component 408 and ultimately the context determination component 404, it is to be understood that the detection component 408 can employ external sensor components (not shown) to effect establishment of a desired context.

In operation, these sensor components 504 can be employed to obtain factors that facilitate establishment of a user context. More particularly, these sensor components 504 can be employed to establish a user state, environmental context, location context, temporal context or the like. This contextual information can be analyzed by the input analyzer component 410 and ultimately input into the receiving component 304 of the power/mode management component 406.

Accordingly, the context analyzer component 306 can be employed to activate/deactivate services/functionality in accordance with the context. As well, the context analyzer component 306 can prompt a power save mode (e.g., sleep) with respect to all or a subset of available resources (e.g., functionality, services) based upon the established contextual information.

The detection component 408 can automatically and continually monitor contextual factors therefore, in the event that the context changes, the context-aware portable device 502 can redistribute and/or reprioritize resources accordingly. As described supra, this dynamic context-dependent redistribution and/or reprioritization of resources can effectively enhance performance (e.g., reduce power consumption, increase processing speed) of the context-aware portable device 502 in accordance with changes in contextual factors.

For example, the detection component 408 can monitor personal information manager (PIM) data thereby communicating information to the input analyzer component 410. Accordingly, the input analyzer component 410 can establish a present context. Continuing with the example, the detection component 408 can monitor PIM data (e.g., schedule, tasks) thereby obtaining factors that can be considered in a determination of the context. It will be understood and appreciated that other factors (e.g., location detected via a global positioning system (GPS)) can be evaluated and included into the establishment of the context. As such, the power/mode management component 406 can regulate resources in order to accomplish a desired result (e.g., power conservation, speed enhancement, memory efficiency).

Figure 6:
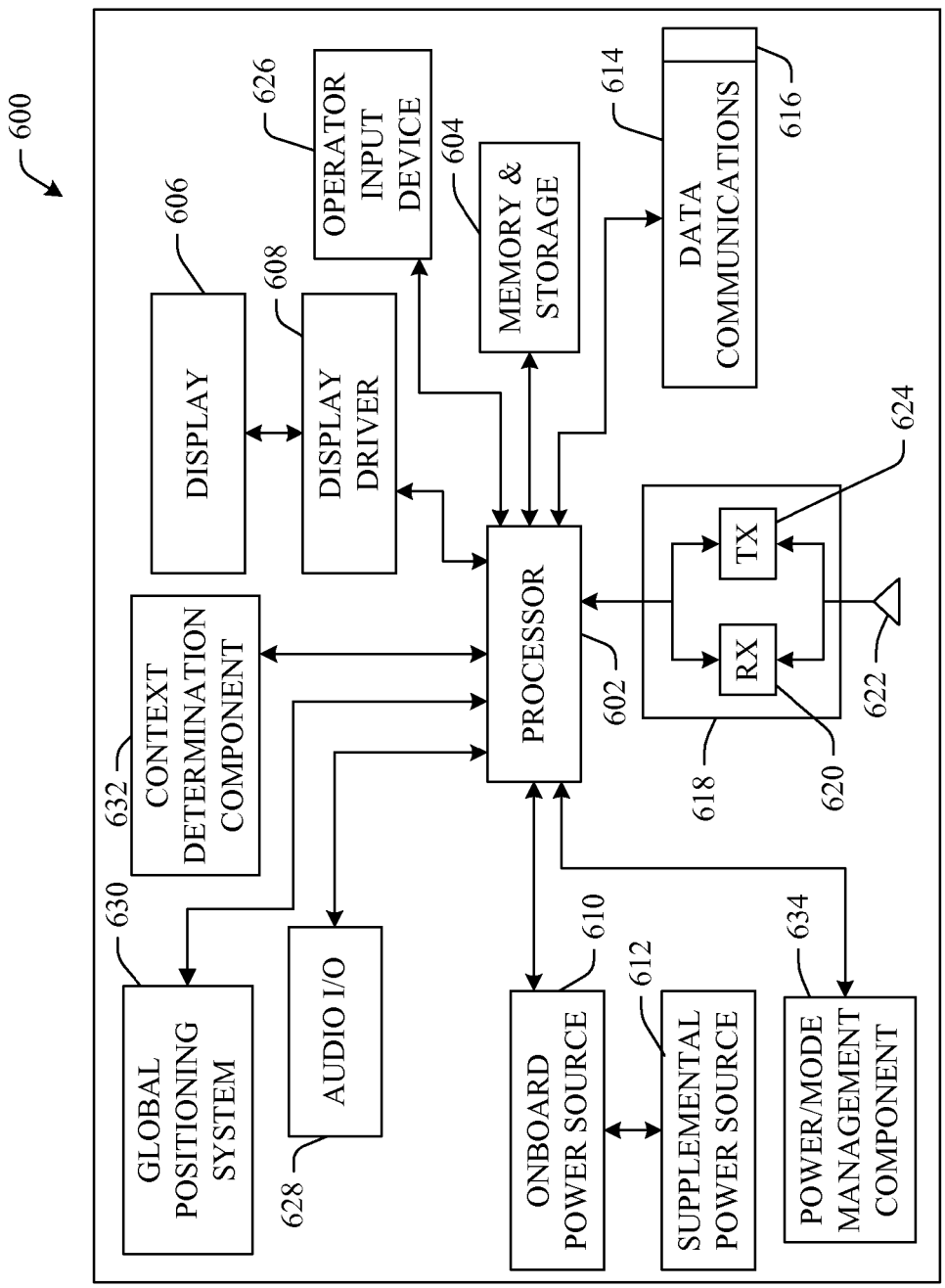
FIG. 6 illustrates an architecture of a multi-modal portable communication device that facilitates power/mode management in accordance with an aspect.

Referring now to FIG. 6, there is illustrated a schematic block diagram of a portable multi-modal multi-lingual hand-held device 600 according to one aspect of the subject invention, in which a processor 602 is responsible for controlling the general operation of the device 600. The processor 602 can be programmed to control and operate the various components within the device 600 in order to carry out the various novel analysis functions described herein. The processor 602 can be any of a plurality of suitable processors. The manner in which the processor 602 can be programmed to carry out the functions relating to the subject invention will be readily apparent to those having ordinary skill in the art based on the description provided herein.

A memory and storage component 604 connected to the processor 602 serves to store program code executed by the processor 602, and also serves as a storage means for storing information such as sensor inputs, PIM data, context data, user/device states or the like. The memory and storage component 604 can be a non-volatile memory suitably adapted to store at least a complete set of the information that is acquired. Thus, the memory 604 can include a RAM or flash memory for high-speed access by the processor 602 and/or a mass storage memory, e.g., a micro drive capable of storing gigabytes of data that comprises text, images, audio, and video content. According to one aspect, the memory 604 has sufficient storage capacity to store multiple sets of information, and the processor 602 could include a program for alternating or cycling between various sets of gathered information.

A display 606 is coupled to the processor 602 via a display driver system 608. The display 606 can be a color liquid crystal display (LCD), plasma display, touch screen display, 3-dimensional (3D) display or the like. In one example, the display 606 is a touch screen display. The display 606 functions to present data, graphics, or other information content. Additionally, the display 606 can render a variety of functions that are user selectable and that control the execution of the device 600. For example, in a touch screen example, the display 606 can render touch selection icons that facilitate user interaction for control and/or configuration of activated and/or masked resources.

Power can be provided to the processor 602 and other components forming the hand-held device 600 by an onboard power source 610 (e.g., a battery pack or fuel cell). In the event that the power source 610 fails or becomes disconnected from the device 600, a supplemental power source 612 can be employed to provide power to the processor 602 (and other components (e.g., sensors, image capture device, . . . )) and to charge the onboard power system 610, if a chargeable technology. In another example, in accordance with a determined context, supplemental power source 612 can be employed thereby conserving power in power source 610.

In still another example, the alternative power source 612 can facilitate an interface to an external grid connection via a power converter (not shown) thereby obtaining power to operate or charge from the external grid in accordance with a determined context. As described supra, in accordance with a determined context, the processor 602 of the device 600 can induce a sleep mode (or other power regulation mode) to reduce the current draw upon detection of an anticipated power failure.

The device 600 includes a communication subsystem 614 that includes a data communication port 616, which is employed to interface the processor 602 with a disparate multi-modal device, an external sensory mechanism(s), remote computer, server, service, or the like. The port 616 can include at least one of Universal Serial Bus (USB) and/or IEEE 1394 serial communications capabilities. Other technologies can also be included, but are not limited to, for example, infrared communication utilizing an infrared data port, Bluetooth™, Wi-Fi, Wi-Max, etc.

The device 600 can also include a radio frequency (RF) transceiver section 618 in operative communication with the processor 602. The RF section 618 includes an RF receiver 620, which receives RF signals from a remote device via an antenna 622 and can demodulate the signal to obtain digital information modulated therein. The RF section 618 also includes an RF transmitter 624 for transmitting information (e.g., data, services) to a remote device, for example, in response to manual user input via a user input (e.g., a keypad, voice activation) 626, or automatically in response to the completion of a location determination or other predetermined and programmed criteria.

The transceiver section 618 can facilitate communication with a transponder system, for example, either passive or active, that is in use with location-based data and/or service provider components. The processor 602 signals (or pulses) the remote transponder system via the transceiver 618, and detects the return signal in order to read the contents of the detected information. In one implementation, the RF section 618 further facilitates telephonic communications using the device 600. In furtherance thereof, an audio I/O subsystem 628 is provided and controlled by the processor 602 to process voice input from a microphone (or similar audio input device). The audio I/O subsystem 628 and audio output signals (from a speaker or similar audio output device). A translator component or multi-language component (not shown) can further be provided to enable multi-lingual/multi-language functionality of the device 600.

The device 600 can employ a global position engine 630 which can generate location context information. This location context information can be combined by processor 602 with other contextual information (e.g., user state, environmental, temporal factors) provided via a context determination component 632 thus prompting activation and/or masking of a resource or group of resources via power/mode management component 634 in accordance with the context and as described in greater detail supra.

Figure 7:
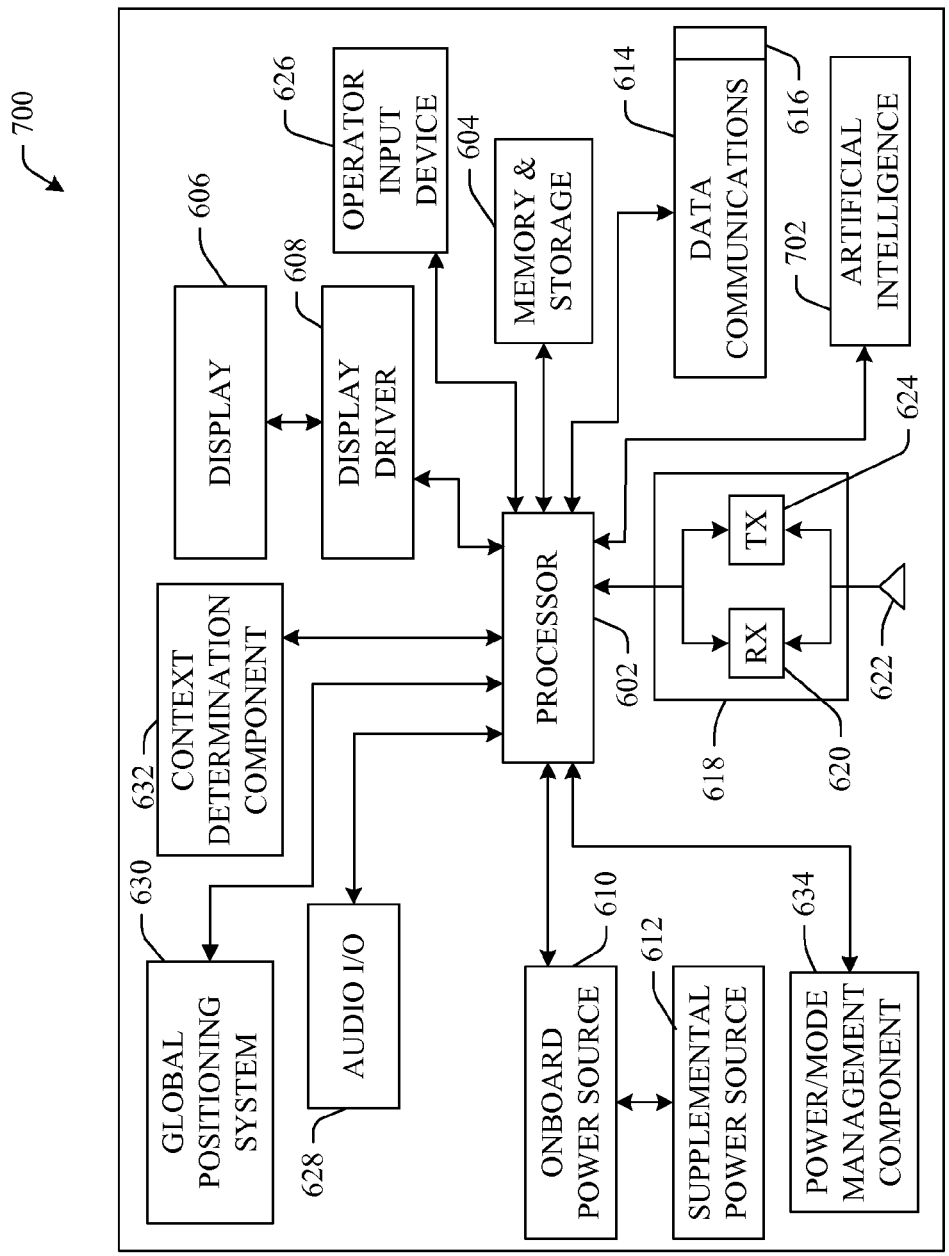
FIG. 7 illustrates an architecture of a portable handheld device including an artificial intelligence reasoning component that can automate functionality in accordance with an aspect of the novel subject matter.

FIG. 7 illustrates a system 700 that employs artificial intelligence (AI) component 702 which facilitates automating one or more features in accordance with the subject invention. The subject invention (e.g., with respect to automatically activating/masking resources, predicting a context, . . . ) can employ various AI-based schemes for carrying out various aspects thereof. For example, probabilistic and/or statistical-based analysis can be employed to effect inferring a user intention and/or preference thereafter automatically inferring and/or predicting a context.

The subject invention (e.g., context determination, resource activation/masking) can employ various AI-based schemes for carrying out various aspects thereof. For example, a process for determining when to activate and/or mask a resource can be facilitated via an automatic classifier system and process. Moreover, where multiple sensors and/or power sources are available from disparate locations, the classifier can be employed to determine which sensor and/or power source from which location will be selected for context factor detection and/or power use.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when/if to activate a resource or group of resources, when/if to mask a resource or group of resources, what a specific context will be, etc. The criteria can include, but is not limited to, the type of device(s), the location of the device, time of day/week/year, number of devices, type(s) of resource(s), etc.

Figure 8:
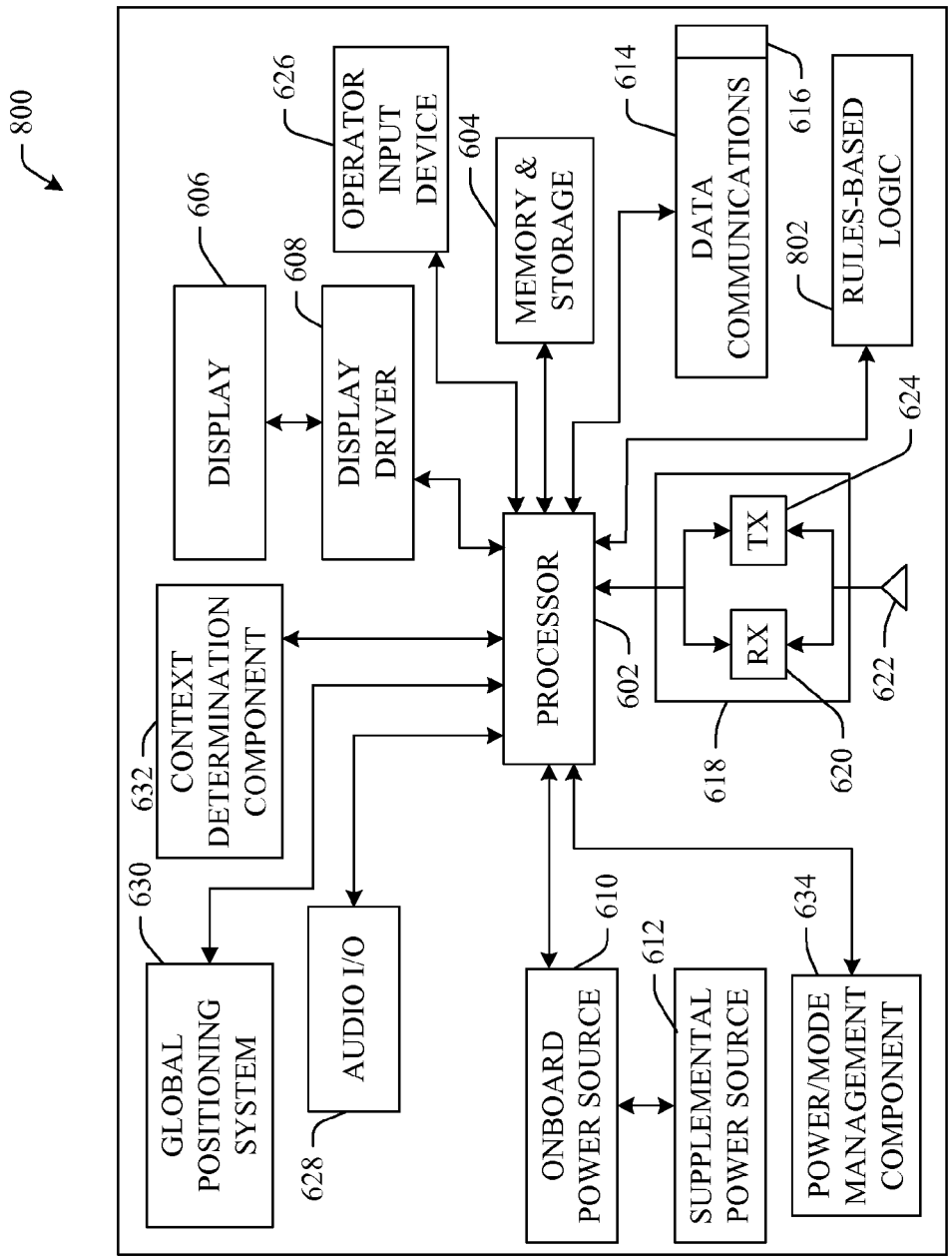
FIG. 8 illustrates an architecture of a portable handheld device including a rules-based logic component that can automate functionality in accordance with an aspect of the innovation.

With reference now to FIG. 8, an alternate aspect of the invention is shown. More particularly, handheld device 800 generally includes a rules-based logic component 802. In accordance with this alternate aspect, an implementation scheme (e.g., rule) can be applied to define acceptable probabilities, determine activation/masking, etc.

By way of example, it will be appreciated that the rules-based implementation of FIG. 8 can automatically determine which resource(s) to activate and/or mask based upon a predetermined criteria. It is to be appreciated that any of the specifications and/or functionality utilized in accordance with the subject invention can be programmed into a rule-based implementation scheme. It is also to be appreciated that this rules-based logic can be employed in addition to, or in place of, the AI reasoning techniques described with reference to FIG. 7.

Figure 9:
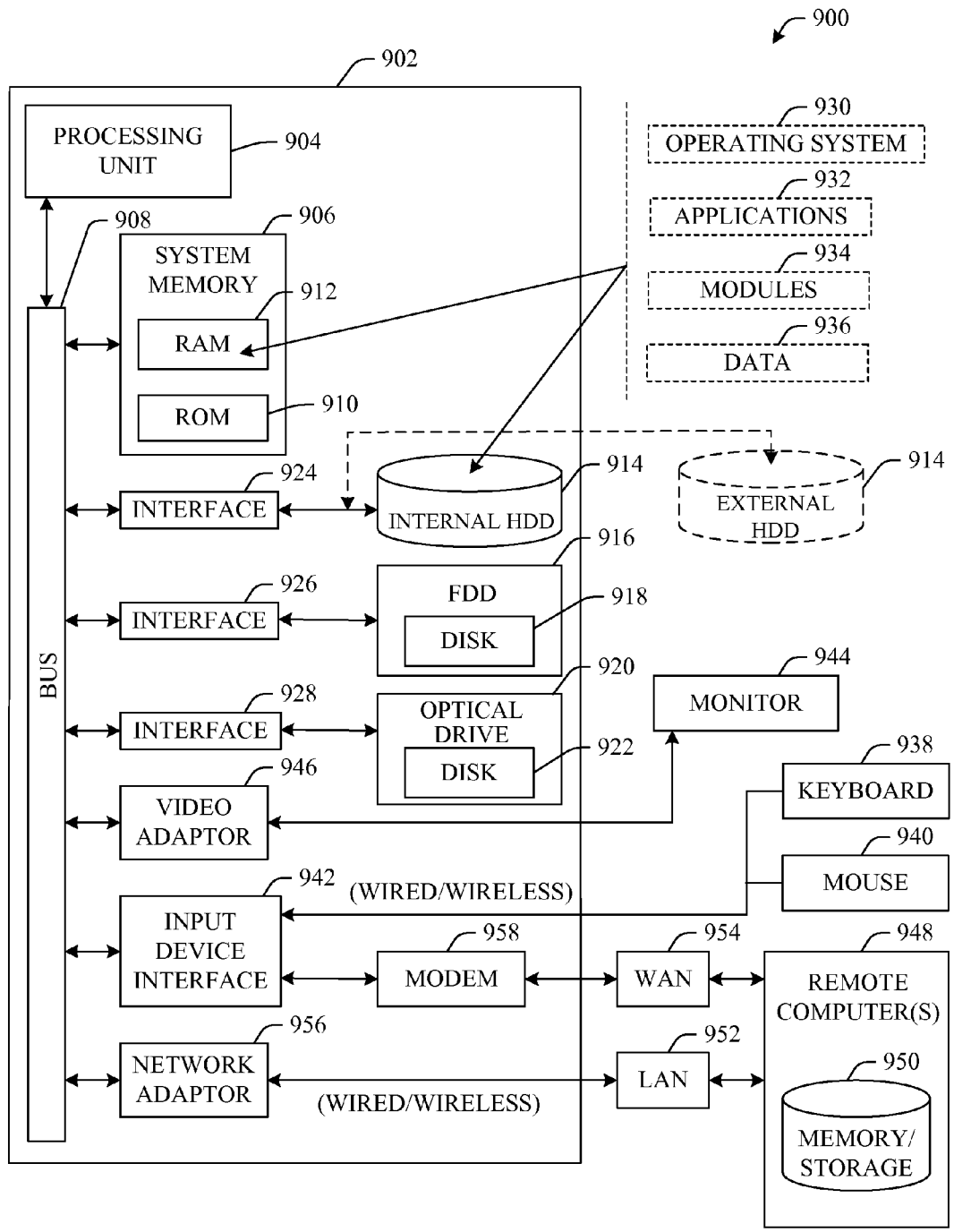
FIG. 9 illustrates a block diagram of a computer operable to execute the disclosed architecture.

Referring now to FIG. 9, there is illustrated a block diagram of a computer operable to execute the disclosed architecture of power/mode management in accordance with a context. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
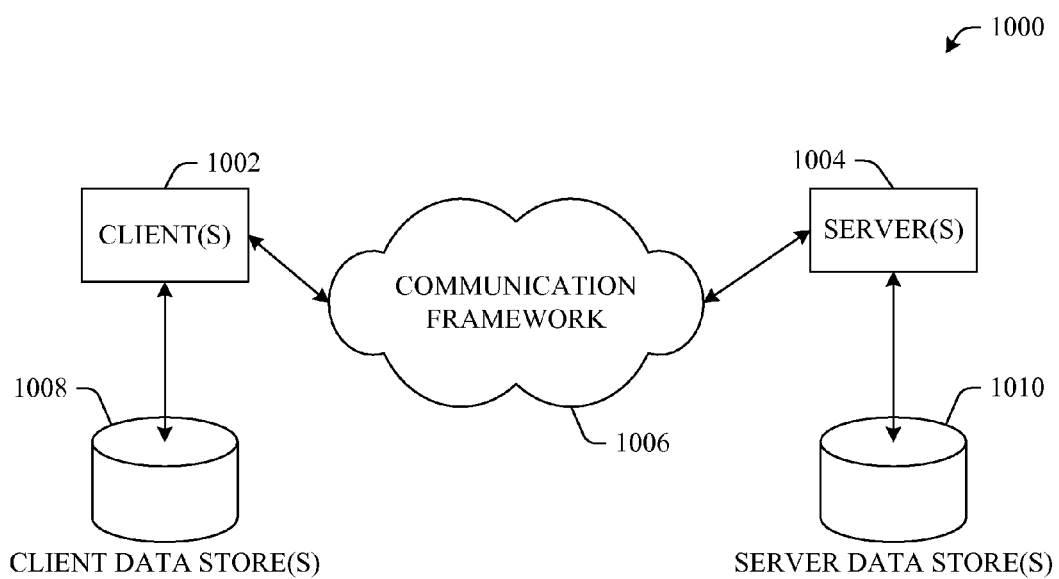
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates dynamic power management, comprising:
    a portable multi-modal device including an onboard power source that provides power to portable multi-modal device during normal operation of the portable multi-modal device,
        a context determination component that determines, independent of a user action, a context based at least in part on at least one of external environment data or internal application data, and
        a power/mode management component including a power conservation component that dynamically enables an alternate power source based at least in part on the context in order to supplement the onboard power source and place the portable multi-modal device in a low power consumption state.

2. The system of claim 1, wherein the system includes a plurality of sensors to obtain external environment data describing an environment external to the portable multi-modal device, the plurality of sensors including:
    a first sensor to obtain physiological data relating to a physiology of a user; or
    a second sensor to obtain environmental data relating to an environment of the user; and
    the content determination component determines the context based at least in part on the physiological data or the environmental data.

3. The system of claim 2, wherein the plurality of sensors include a global positioning system (GPS) that identifies at least one of the user's present location or movement.

4. The system of claim 1, wherein the portable multi-modal device is at least one of a personal data assistant (PDA), smart-phone, cellular phone, pocket computer, or personal music player.

5. The system of claim 1, wherein the power/mode management component places a subset of device functionalities into a sleep mode in accordance with the context.

6. The system of claim 1, wherein the power/mode management component bypasses a subset of device functionalities in accordance with the context.

7. The system of claim 1, wherein the power/mode management component places a subset of device functionalities in a low power consumption state based at least in part on the context, and the device functionalities include at least an indicator, a display, a hard disk, a volume control, an image capture function, or an audible alert.

8. The system of claim 7, further comprising a rules-based logic component to determine which subset of device functionalities to place in low power consumption state in accordance with the context.

9. The system of claim 1, wherein the context is inferred using one of probabilistic or statistical-based analysis.

10. The system of claim 1, wherein the power/mode management component is configured to determine whether operating a specific sensor of the plurality of sensors would consume more power than providing services associated with the specific sensor, and configured to respond to the determination in a manner that conserves the most power.

11. The system of claim 1, wherein the power/mode management component and the context determination component are configured to anticipate a context and automatically manage functionalities of the portable multi-modal device in accordance with the anticipated context.

12. A method for dynamically managing power consumption of a portable multi-modal device, comprising:
monitoring personal information manager (PIM) data to establish a present state of a user;
determining the present state of the user based at least in part on the PIM data;
determining priorities amongst functionalities of the portable multi-modal device in accordance with the present state of the user; and
independent of user action, placing a subset of functionalities of the portable multi-modal device in a low power consumption state based at least in part on the priorities, wherein placing the subset of functionalities in the low power consumption state comprises reducing performance of the subset of functionalities to conserve power.

13. The method of claim 12, further comprising:
employing an artificial intelligence scheme to infer when to place the portable multi-modal device in a low power consumption state.

14. The method of claim 12, further comprising:
employing rules-based logic to determine which subset of functionalities to place in the low power consumption state given the user state.

15. The method of claim 12, further comprising:
inferring the user state using one of probabilistic or statistical-based analysis.

16. The method of claim 12, further comprising:
bringing a second subset of functionalities out of low power consumption state based at least in part on the determined user state.

17. The method of claim 12, further comprising:
placing the subset of functionalities in the low power consumption state based on an inferred user preference.

18. The method of claim 12, further comprising:
employing a global positioning system (GPS) to determine the location context for the user.

19. The method of claim 12, further comprising:
determining that the subset of functionalities is unnecessary given the present state of the user; and
automatically deactivating the subset of functionalities based on the present state of the user.

20. A system that facilitates optimization of power consumption, comprising:
means for determining, independent of user action, that a user is unable to receive telephone calls; and
means for placing, independent of user action, a subset of functionalities of an electronic device that are unnecessary for telephone calls in a low power consumption state based at least in part on the determining.

* * * * *